United States Patent
Nasca et al.

(10) Patent No.: US 10,189,377 B2
(45) Date of Patent: Jan. 29, 2019

(54) SYSTEM AND METHOD FOR ADJUSTMENT OF AN ASSEMBLY

(71) Applicant: GM GLOBAL TECHNOLOGY OPERATIONS LLC, Detroit, MI (US)

(72) Inventors: Jeff E. Nasca, Bloomfield Township, MI (US); Daniel W. Booth, Troy, MI (US); William Otto, Lake Orion, MI (US); Leigh A. Berger, Brighton, MI (US); Scott D. Thomas, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 41 days.

(21) Appl. No.: 15/293,973

(22) Filed: Oct. 14, 2016

(65) Prior Publication Data
US 2018/0105069 A1    Apr. 19, 2018

(51) Int. Cl.
*B60N 2/02* (2006.01)
*B60N 2/22* (2006.01)
*B60N 2/12* (2006.01)

(52) U.S. Cl.
CPC ......... *B60N 2/0232* (2013.01); *B60N 2/0228* (2013.01); *B60N 2/12* (2013.01); *B60N 2/22* (2013.01); *B60N 2002/0272* (2013.01)

(58) Field of Classification Search
CPC ....... B60N 2/0232; B60N 2/0228; B60N 2/22
See application file for complete search history.

(56) References Cited

U.S. PATENT DOCUMENTS

| | | | | |
|---|---|---|---|---|
| 4,473,724 A * | 9/1984 | Suzuki | ................... | B60K 37/06 200/5 R |
| 4,678,872 A * | 7/1987 | Gutman | ............... | B60N 2/0228 200/329 |
| 5,384,440 A * | 1/1995 | Wnuk | .................. | B60N 2/0228 200/18 |
| 5,864,105 A * | 1/1999 | Andrews | .............. | B60N 2/0228 200/5 R |
| 5,866,862 A * | 2/1999 | Riffil | .................... | B60N 2/0228 200/5 R |
| 6,774,505 B1 * | 8/2004 | Wnuk | .................. | B60N 2/0228 307/10.8 |
| 8,835,780 B2 * | 9/2014 | Salagean | .............. | B60N 2/0228 200/5 A |
| 2005/0006939 A1 * | 1/2005 | Hancock | .............. | B60N 2/0228 297/354.12 |

* cited by examiner

*Primary Examiner* — Philip F Gabler
(74) *Attorney, Agent, or Firm* — Quinn IP Law (57) ABSTRACT

A seat assembly includes a first member and a second member located proximate to the first member. An adjustment system for adjustably positioning the first and second members of the seat assembly includes at least one positioning mechanism operatively connected to one or more of the first member and the second member and at least one actuator connected to the at least one positioning mechanism. A control assembly including a housing having a control region, one or more guide surfaces extending from the control region and one or more recessed areas cooperating with the one or more guide surfaces. At least one of the guide surfaces or recessed areas cooperates with at least one switch configured to send a first signal to a controller when a user activates the at least one switch. The controller is configured to generate an activation signal to activate the at least one actuator.

20 Claims, 5 Drawing Sheets

SYSTEM AND METHOD FOR ADJUSTMENT OF AN ASSEMBLY

INTRODUCTION

This disclosure relates to a system and method for adjustment of at least one of a first member and a second member of an assembly.

Assemblies, such as seat assemblies in vehicles, are adjustably attached to the vehicle. Seats are adjustable to a variety of positions and configurations through the use of seat adjustment systems. In order to adjust a seat, a vehicle occupant first releases a latch mechanism manually or via a power or other mechanical or electromechanical system of the seat adjustment system, and maintains the latch mechanism or other mechanical or electromechanical in the released position during adjustment of the seat. For example, a seat back may be adjusted relative to a seat bottom to fold forward for passenger access to areas located rearward of the seat in the vehicle. Many seat adjustment systems incorporate electromechanical levers, switches and motors to effect movement of the seat components and the releasable engagement of latching mechanism.

SUMMARY

A system and method for adjustment of at least one of a first member and a second member of an assembly may include a seat assembly includes a first member and a second member located proximate the first member. An adjustment system operable for use with a seat assembly includes at least one positioning mechanism operatively connected to one or more of the first member and the second member and at least one actuator connected to the at least one positioning mechanism. A control assembly includes a housing having a control region, one or more guide surfaces extending from the control region and one or more areas cooperating with the one or more guide surfaces to receive at least one switch configured to send a first signal when a user activates the at least one switch. The one or more areas may be may be recessed or raised surfaces or areas relative to the control region.

A controller is in communication with the at least one switch and the at least one actuator. The controller is configured to receive the first signal from the at least one switch and generate an activation signal to activate at least one actuator. The one or more guide surfaces and one or more recessed or raised areas of the control assembly are formed on the control region to represent at least one of the first member and second member of the seat assembly to guide a user to the at least one switch to control movement of at least one of the first and second members of the seat assembly with the at least one actuator and at least one positioning mechanism.

The control assembly may further include a unitary guide surface extending from the control region of the housing and shaped to represent the first member and second member of the seat assembly. The one or more areas formed in the control region extend at least partially about an outer periphery of the unitary guide surface to receive a plurality of switches to control movement of the seat assembly. The at least one switch may comprise one or more of a capacitive, mechanical and/or piezoelectric switch.

The control assembly may include indicia provided on and configured to identify one or more of at least one switch, one or more guide surfaces and one or more areas. The indicia may include a tactile surface, three dimensional shape or feature which differentiates the feature from surrounding surfaces, such as a more distinctive bumpy or smooth region compared to surrounding surfaces provided on one or more of the at least one switch, one or more guide surfaces and one or more areas. The control assembly may also include at least one locating portion disposed on the control region to provide a reference area for one or more of the at least one switch, one or more guide surfaces and one or more areas. Alternatively, the control region of the control assembly may include a curved surface or two adjacent surfaces to provide a reference area for one or more of the at least one switch, one or more guide surfaces and one or more areas.

In another embodiment, a method for selectively adjusting at least one of a first member and a second member of an assembly comprises providing a control assembly including a housing having a control region, one or more guide surfaces extending from the control region and one or more areas cooperating with the one or more guide surfaces to receive at least one switch. A first signal is generated by the at least one switch in response to activation of the at least one switch by a user. A controller receives the first signal in electrical communication with the at least one switch.

An activation signal is transmitted from the controller to at least one actuator and one or more of a first member and a second member of the seat assembly are positioned with at least one positioning mechanism operatively connected to the at least one actuator in response to the activation signal. The method further comprises providing a plurality of switches in the one or more are as that are configured to generate the first designated signal in response to activation by the user. The method may further comprise generating a signal to instruct continuous activation of the at least one actuator and at least one positioning mechanism in response to continuous activation of the plurality of switches. The method may further comprise providing feedback in response to activation of the at least one actuator and at least one positioning mechanism, wherein the feedback is selected from a group consisting of audible, visual and haptic feedback.

The above features and advantages and other features and advantages of the present disclosure are readily apparent from the following detailed description of the best modes for carrying out the disclosure when taken in connection with the accompanying drawings.

DETAILED DESCRIPTION

Reference will now be made in detail to several embodiments of the disclosure that are illustrated in the accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure in any manner.

Figure 1:
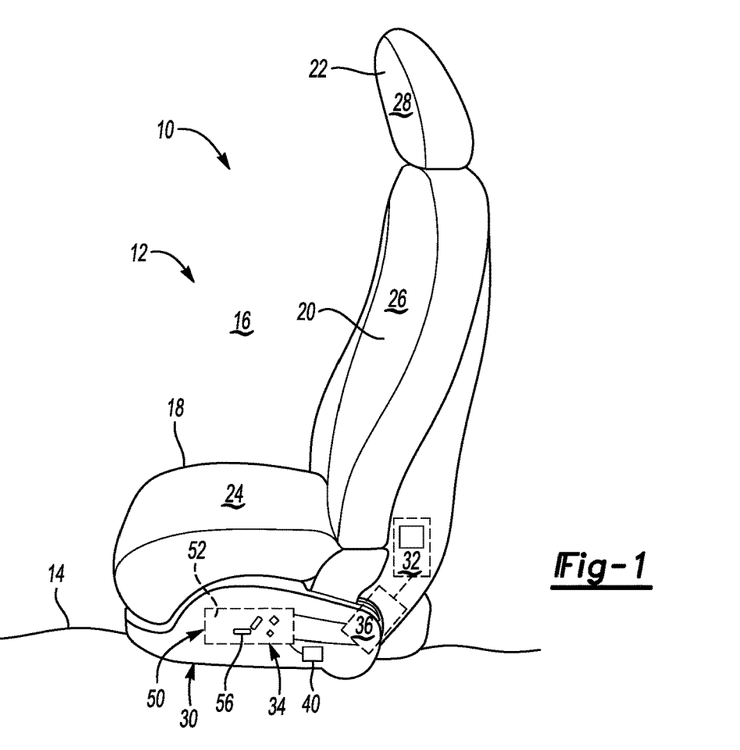
FIG. 1 is a perspective schematic view of a seat assembly having a first embodiment of an adjustment system.

Referring to the drawings, wherein like reference numbers correspond to like or similar components throughout the several Figures, a vehicle 10 is shown schematically in FIG. 1. The vehicle 10 may be a mobile platform, including a motorized vehicle, such as, but not limited to, standard passenger cars, sport utility vehicles, light trucks, heavy duty vehicles, minivans, buses, transit vehicles, trains, airplanes, bicycles, robots, farm implements, sports-related equipment or other transportation device.

Vehicle 10 includes a seat assembly 12 mounted to a floor 14 of the vehicle 10 or to other vehicle structure not shown in the Figures, such as a tunnel, center console, or rocker. The vehicle 10 defines a passenger compartment 16 in which the seat assembly 12 is disposed. The seat assembly 12 includes a first member 18. A second member 20 is located proximate to the first member 18 and may be another member of the seat assembly 12 or part of the vehicle 10.

In the embodiment shown in FIG. 1, the first member 18 is a lower seat portion or seat bottom and the second member 20 is an upper seat portion or seatback. The first member 18 and the second member 20 may be members that are adjustable relative to one another. A positioning mechanism 36 is located between the first member 18 and the second member 20 to selectively prevent movement of the second member 20 relative to the first member 18. In the embodiment shown in FIG. 1, the positioning mechanism 36 selectively prevents or enables movement of the second member or seatback 20 relative to the first member or seat bottom 18.

The seat assembly 12 may also include a headrest assembly 22. The first member or seat bottom 18 defines a generally horizontally-oriented surface 24 for supporting an occupant (not shown). The second member or seatback 20 is mounted with respect to the first member 18, and defines a surface 26 for supporting the back of the occupant. The second member 20 is adjustable with respect to the first member 18 so that the reclination angle is selectively variable by the occupant. In addition to the reclination angle, the second member 20 may be rotated and/or adjusted in a forward manner to allow the occupant access to the passenger compartment 16 behind the seat assembly 12. Further, the second member 20 of the seat assembly 12 may be capable of translating relative to the first member 18 where the location is selectively variable by the occupant.

As used herein, the "forward direction" of orientation refers to the direction an occupant of the seat assembly 12 would be facing when seated with their back against surface 26 of the second member 22. Other directions described herein follow the same frame of reference. The seat assembly 12 may be in a position within a vehicle 10, such as, a front row, middle row or rear row seat. Additionally, the second member 20 may also be positioned in a "fold flat" manner to provide an adjustable storage arrangement. As used herein, the term "fold flat" generally refers to the second member 20 of the seat assembly 12 arranged in a generally parallel configuration with the surface 24 of the seat bottom or first member 18. Other unoccupied seat configurations are also possible, where at least one of the first member 18 and the second member 20 are oriented to enable cargo storage or entry or egress to a seating row rearward of the seat assembly 12. These orientations are found on seating rows aft of the first seating rows in SUV, crossover, and truck style vehicles.

The headrest assembly 22 is mounted to the upper end of the second member 20. The headrest assembly 22 is depicted as a separate member from the second member 20. However, it should be noted that, within the scope of the claimed disclosure, a headrest assembly 22 may be an integral part of a second member 20 as understood by those skilled in the art. For example, a headrest 22 may be the upper portion of the second member 20.

The headrest assembly 22 defines a surface 28 that faces generally the same direction as surface 26 for supporting the back of the occupant's head. The headrest assembly 22 may be adjustable with respect to the second member 20 so that the support height is selectively variable by the occupant. Additionally, the headrest assembly 22 may be adjustable in generally vertical or up and down manner to accommodate an occupant or may pivot forward to allow the headrest assembly 22 to fold forward, for example to accommodate positioning the second member 20 in the "fold flat" manner relative to the first member 18.

Other configurations and manners of adjustment between the first member 18 and the second member 20 of the vehicle 10 may be contemplated, for example, but not limited to, selectively variable adjustment of the seat assembly 12, including the height and fore/aft position of the first member 18 and the second member 20 with respect to the floor 14, the reclination angles of the first member 18 and second member 20 with respect to horizontal or vertical and the height and reclination angle of the headrest assembly 22 with respect to the second member 20. One skilled in the art would be able to determine the number and combinations of adjustments between the first member 18 and the second member 20.

The seat assembly 12 includes an adjustment system 30. The adjustment system 30 may include at least one actuator 32, at least one switch 34, and/or at least one positioning mechanism 36. The at least one actuator 32 may be operatively connected to the at least one positioning mechanism 36 to move the mechanism 36 from a locked position to at least one released position or to another locked position, as described in further detail below. The at least one actuator 32 and/or the at least one switch 34 may be in communication with a controller 40. Sensors (not shown) in communication with the controller 40 may monitor one or more parameters of the seat assembly 12 and the adjustment system 30. For example, the sensors may monitor the positions of the first member 18, second member 20 and/or the headrest assembly 22.

The at least one actuator 32 may include a servo motor operatively connected to one or more components of the seat assembly 12. For example, servo motors of the at least one actuator 32 may cooperate with the at least one positioning mechanism 36 to selectively move the first member 18 fore and aft, and up and down, as well as to adjust the reclination angle of the first member, adjust the reclination-angle of the second member 20 relative to the first member 18 and selectively raise and lower and move the headrest assembly 22 fore/aft relative to the second member 20. Other electromechanical devices could also be utilized, such as a shape memory alloy or the like.

In the embodiment shown in FIG. 1, the at least one actuator 32 and the controller 40 are illustrated schematically as being located in the second member 20, though it is understood that the actuator 32 and controller 40 may, alternatively, be located in the first member 18 or in two distinct locations. The at least one switch 34, in response to activation or deactivation by a user, may be in electrical communication to send at least a first signal to the controller 40. In addition, the controller 40 may be integral to one or more switches 34. As will be described in greater detail below, the first signal may be generated in response to an amount of pressure, coverage of a surface area or actuation of a specific signal or the like of the at least one switch 34 as interpreted by the controller 40. The controller 40 receives the first signal from the at least one switch 34 and generates and transmits an activation signal for the at least one actuator 32 to release or engage the associated at least one positioning mechanism 36.

That is, in response to the first signal from the at least one switch 34, the controller 40 commands the at least one actuator 32 to move the at least one positioning mechanism 36 from the locked position to the released position or to another locked position. Each seat assembly 12 may include multiple actuators 32 which may be actuated by one or more corresponding switches 34 acting independently or in combination as described below and be in communication with one or more controllers 40. In addition, each seat assembly 12 may include multiple positioning mechanisms 36 which enables movement at the joints between different seat members and between different seat members and the vehicle 10.

The at least one switch 34 may be positioned relative to the seat assembly 12 in a seat adjustment location 38. The seat adjustment location 38 may be a location on the seat assembly 12 which would commonly be touched by the user during adjustment of the seat assembly 12. Alternatively, the seat adjustment location 38 may also be external of the seat assembly 12, such as, but not limited to, a door panel, instrument panel, console assembly and/or touch screen display device.

For example, the at least one switch 34 may be integrated into an existing trim or structural component of the seat assembly 12 thereby eliminating handles/levers to create an aesthetically pleasing and clutter-free appearance on the seat assembly 12. As shown in FIG. 1, the seat adjustment location 38 is provided on an exterior surface of the seat assembly 12 adjacent the first member or seat bottom 18. One skilled in the art would be able to determine an appropriate seat adjustment location 38 based upon typical user seat adjustment methods and ergonomics. The seat adjustment location 38 for each switch 34 is particular to the associated adjustment of a corresponding actuator 32 and/or positioning mechanism 36 cooperating with the seat assembly 12. It is also possible to place the seat adjustment location 38 under the show surface material on a seat assembly 12.

There may be multiple seat adjustment locations 38 associated with a particular type of adjustment for the seat assembly 12 since a user may commonly choose several positions to touch the seat assembly 12 for that particular adjustment. Switches 34 may be located at each of or a combination of the seat adjustment locations 38 and connected to the at least one actuator 32 for that particular seat assembly 12 adjustment. When the user has completed adjustment of the seat assembly 12 and completes actuation of the at least one switch 34, such as when the user is no longer sensing the presence of and/or touching the switch's active surface, the actuator 32 is deactivated, and the positioning mechanism 36 returns to the released or engaged position.

When the user activates or deactivates at least one switch 34 at a location that is associated with a portion of the seat assembly 12, the switch 34 sends a first signal to the controller 40. The controller 40 receives the first signal from the at least one switch 34 and may interpret the user intention from multiple simultaneous touches sensed at different switch 34 locations. The controller 40 may take into account the combination/subset of the at least one switch 34 touched or activated and other related system factors that may include but are not limited to whether the vehicle is in motion, including, but not limited to, position of child safety locks, such as whether the primary user locked the seat position to prevent kids from moving the seats around, the available power to system to actuate the actuator, physical impediments to adjustment of the second member 20, sensor malfunction, or other general safety information.

The controller 40 may be connected to a main power supply (not shown) for the vehicle 10 to provide the power to activate the at least one actuator 32. The at least one switch 34 may be an independent component that is in communication with the actuator 32 directly, for example, through a wire electrically connecting the components. In this manner, the switch 34 may easily be located remotely from the actuator 32. Further, a small power supply may be sufficient for operating the switch 34 and a larger power supply may be utilized to provide the power to actuate the actuator 32. In one embodiment, the controller 40 maps a particular combination of switches 34 that are touched by the user to move a particular adjustment feature, to a specific combination of actuators 32 that releases and re-engages the positioning mechanism 36 corresponding to the chosen adjustment feature, as explained in further detail below.

The controller 40 may either detect the state of the seat assembly 12 by monitoring one or more components of the adjustment system 30 and vehicle 10 or may infer the state of the seat assembly 12 from indirect measurements via an algorithm or the like. The information may be provided to or collected by the controller 40 from other vehicle system employing the same information, or the controller 40 may employ algorithms to calculate the required data. Therefore, the control logic by the controller 40 may aggregate a variety of factors in addition to registering the touches and interpreting user intent before acting on the sensed signals and may also employ logic that includes a learning algorithm that tunes the sensitivity of the switches 34 to the use habits of one or more users.

The controller 40 receives the first signal from the switch 34 and utilizes signal conditioning and logic to interpret the user intention from multiple simultaneous touches or lack of touches sensed at different switch 34 locations. The signal conditioning by the controller 40 may enable acquisition of the first signal, from the switch 34, with a high signal-to-noise ratio over the entire operating range, such as temperature, humidity and the like of the vehicle 10.

The controller 40 may take into account the combination/subset of switches 34 touched and other related system factors. For example, these factors may include but are not limited to whether the vehicle in motion, position of child safety locks, such as whether the primary user locked the seat position to prevent kids from moving the seats around, the available power to system to actuate the actuator, impediments, such as bags or the like, to adjustment of the second member 20, sensor malfunction, whether the airbags or seat belt pretensioners have deployed or other general safety information. This information is either sensed directly from a variety of sensors existing in the vehicle 10 or is inferred from indirect measurements via an algorithm or the like.

The information may be provided to or collected by the controller 40 from one or more other vehicle systems employing the same information, or the controller 40 may employ an algorithm or the like to calculate the required data. Therefore, the control logic by the controller 40 may aggregate a variety of factors in addition to registering the touches and interpreting user intent before acting on the sensed signals. The controller 40 may also employ logic that includes a learning algorithm that evolves/tunes the sensitivity of the switches 34 to the use habits of one or more users. This may take the form of supervised or unsupervised learning.

Referring now to FIGS. 2 through 6, a variety of configurations of a control assembly for use with the at least one seat adjustment system 30 for use with the seat assembly 12 of a vehicle 10 are illustrated and described in greater detail. As illustrated in FIGS. 2A and 2B, the at least one seat adjustment system 30 may include a control assembly 50 for the at least one switch 34 that includes a control region 52 provided on or adjacent housing or panel or mounting structure that may be disposed on an exterior surface or under an exterior surface of the first member 18 or may be disposed on another portion of one of the first member 18 or second member 20 of the seat assembly 12 or other vehicle surface as described above.

Figure 2A:
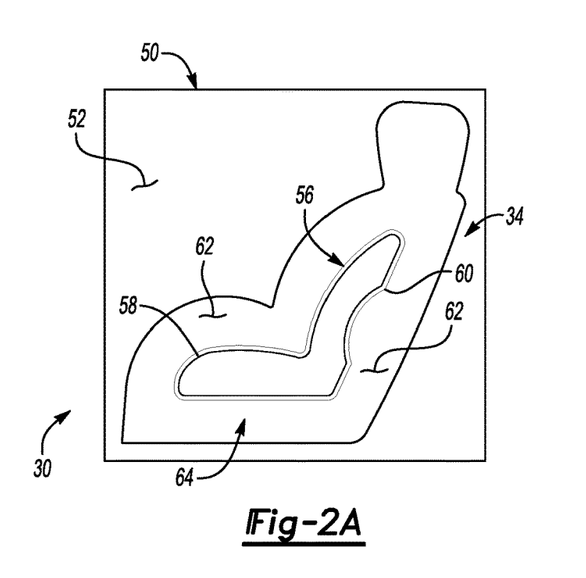
FIGS. 2A-2D illustrate side views of one embodiment of a control assembly configuration for the adjustment system of the seat assembly.
Figure 2B:
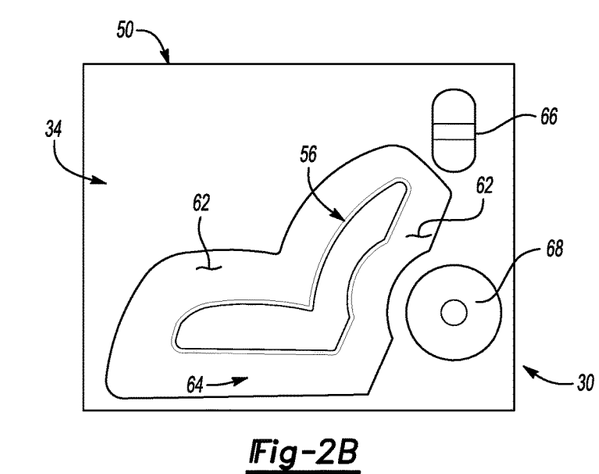

It is understood that the control region 52 and mounting structure to be integral to the exterior surface cover material, as technologies exist to integrate the switch 34, control region 52 and mounting structure within at least one layer of the cover material. As shown and described herein, a user initiates contact with the control assembly 50 via hand or finger motion to adjust the position of the seat assembly 12. It is contemplated that the configuration of the control assembly 50 may be optimized to allow engagement by the user in a position where the user is unable to visualize the control assembly 50.

One or more projections or guide surfaces 56 extend from the control region 52. As shown in FIGS. 2A and 2B, the one or more guide surfaces 56 may be formed as a unitary member in a configuration similar to the seat assembly with a first portion 58 of the guide surface 56 representing the first member or seat bottom and a second portion 60 of the guide surface 56 representing the second member or seat back. It is understood that the first and second portions 58, 60 of the guide surfaces 56 may also be formed or provided on the control region 52 as discrete segments. For example, the one or more guide surfaces 56 may be contoured to match the position, geometry and/or contour of the related portion of the seat assembly 12.

The one or more guide surfaces 56 may be disposed on discrete planes to distinguish a first member 18 and second member 20 of the seat assembly 12. It is also contemplated that the one or more projections may include at least one stop or barrier that separates portions of the control assembly and may also serve to separate adjacent functions of the adjustment system 30. It is contemplated that one or more segments of the guide surfaces 56 may receive components of the at least one switch 34. For example, the one or more segments of the guide surfaces 56 may include one or more touch sensitive or capacitive switches, generally referenced by numeral 64

In one embodiment of the disclosure, the control assembly 50 of the adjustment system 30 includes one or more areas 62 at least partially extending about an outer periphery of the one or more guide surfaces 56. The one or more areas 62 may be raised or recessed relative to the control region shaped to generally represent the seat assembly 12. It is contemplated that one or more segments of the areas 62 may receive components of the at least one switch 34. For example, the one or more segments of the areas 62 may include one or more touch sensitive or capacitive switches, generally referenced by numeral 64.

Switches 64 may respond to a user's presence adjacent the switch or touch with minimal or no force beyond the touch required to activate the switch 64. The switches 64 may be capacitive, mechanical and/or piezoelectric. In fact, the touch sensitive switch 64 of the at least one switch 34 may be able to detect the user's touch prior to the actual touching of the switch 64, such as by detecting a change in capacitance resulting from user proximity to the switch 34.

Alternatively, as is shown in FIG. 2B, the at least one switch 34 may have one or more portions that are a mechanical switch 66, such as a pressure or strain sensitive switch, that relays an electrical signal when the switch 34 is activated. In FIG. 2B, switch 66 may be disposed adjacent the top of the second portion 60 in a position replicating the position of the headrest 22 of the seat assembly 12 to allow a user to adjust the position of the headrest 22 relative to the second member 20. Alternatively, the mechanical switch 66 may be part of a guide surface 56 or a raised or recessed area 62.

Further, the at least one switch 34 may be a sensor, such as a piezoelectric based switch 68 shown adjacent the second portion 60 of the guide surface 56. The piezoelectric based switch 68 may generate an electrical signal when the at least one switch 34 is activated by the use. As shown in FIG. 2B, the piezoelectric based switch 68 may be position adjacent the bottom of the second portion 60 adjacent the intersection with the first portion 58 to represent a lumbar activation system of the seat assembly 12.

The signal from the piezoelectric based switch 68 of the at least one switch 34 is sent to the controller 40 for the lumbar activation system and the controller 40 thereby generates an activation signal for the associated lumbar activation system. It is understood that one or more touch sensitive switches 64, mechanical switches 66 and/or piezoelectric switches 68 may be interchangeably used as shown in the Figures and described herein to accomplish the objectives of the disclosure.

Figure 6:
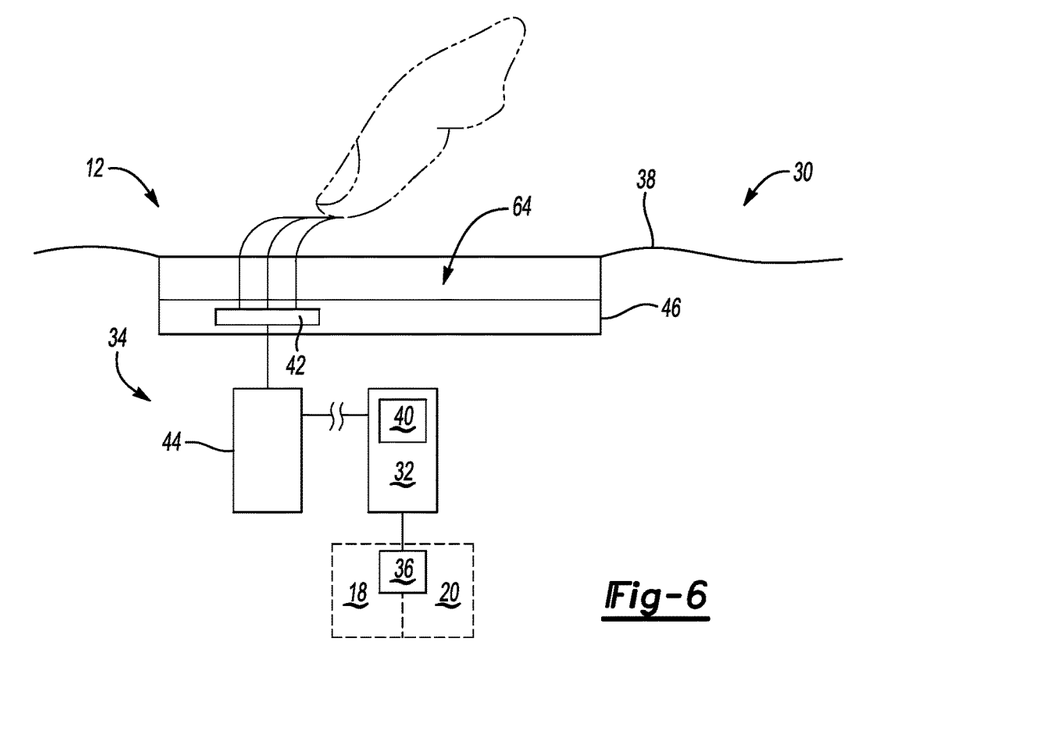
FIG. 6 is a schematic illustration of an embodiment of a switch for the adjustment system of the seat assembly.

Referring now to FIG. 6, the one or more touch sensitive, mechanical, piezoelectric or capacitive switches 64 of the at least one switch 34 are described in greater detail. In the embodiment shown, the at least one switch 34 is located on a seat assembly 12 in a seat adjustment location 38. The touch sensitive switch 64 may include a sensor 42 located beneath or integrated into the one or more areas 62 or one of the raised guide surface projections 56 of the control region 52 or other structure of the seat assembly 12. The area 62 may protect the sensor 42 and provide a smooth surface for user interaction.

Sensor 42 may be a capacitive sensor to sense the change in capacitance from the user's finger or hand when the user or an object is placed proximate switches 64 in the one or more areas 62 or guide surface projections of the control region 52 of the control assembly 50 of the switch 34. In the embodiment shown, the sensor 42 may be incorporated within a printed circuit board (PCB) or a flexible circuit board 46. The change in capacitance recorded by the sensor 42 is converted into a digital signal with a sensor converter 44 that is electrically connected to the sensor 42 and the PCB 46. The sensor converter 44 sends the digital signal that is generated to a controller 40 of at least one actuator 32 to engage or release the associated at least one positioning mechanism 36 to allow movement of the seat assembly 12.

Figure 2C:
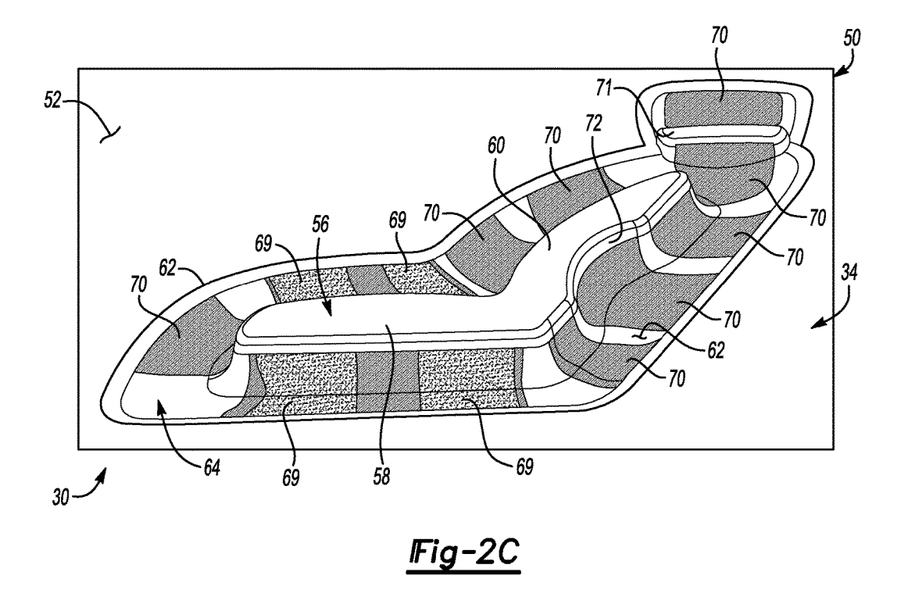
Figure 2D:
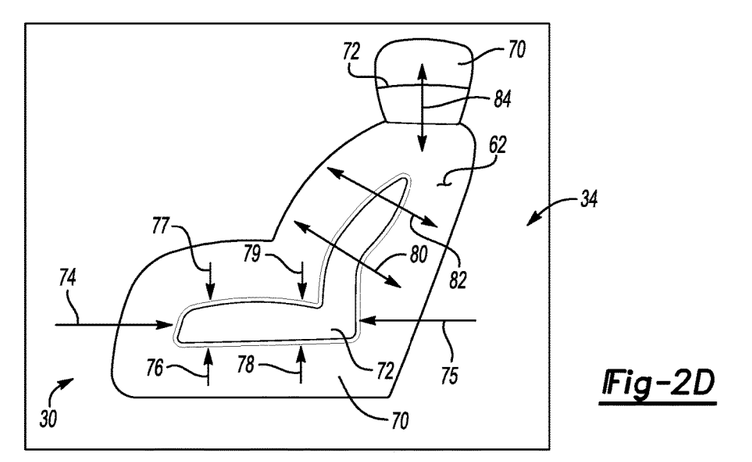

Referring additionally now to FIGS. 2C and 2D, the areas 62 of the control region 52 of the control assembly 50 includes a plurality of actuation positions 70 which correspond to a portion of the seat assembly 12. While it is illustrated that the one or more guide surfaces 56 extend from the control region 52 while the actuation positions 70 of the at least one switch 34 are disposed in area 62, it is understood that an alternative arrangement may also be implemented, wherein the one or guide surfaces 56 may be recessed in the control region 52 while the at least one switch 34 and/or the plurality of actuation positions 70 may extend or project outward relative to the control region 52 and the one or more guide surfaces 56. As illustrated in FIG. 2C, actuation positions, generally referenced by reference number 69, may allow for multiple functions or operations.

It is further contemplated that the one or more areas 62, one or more guide surfaces 56, on the at least one switch 34 and/or plurality of actuation positions 70 may include an indicia 71 to assist the user in identifying a position 70 and/or switch 34 on the control assembly 50. The indicia 71 may include a tactile surface, three dimensional shape or feature which differentiates the feature from surrounding surfaces, such as a more distinctive bumpy or smooth region compared to surrounding surfaces provided on one or more of the at least one switch, one or more guide surfaces and one or more areas. Alternatively, the one or more guide surfaces 56 may be formed having a distinct geometry that may be used as indicia 71 for guiding the user to the control assembly 50. It is also understood that a combination of these elements may be used such as a beveled or angled surface or a recessed or proud localized region. It is also understood that the indicia 71 may be of varying quantity and size to represent seat adjustment functions such as the expansion or contraction, raising or lowering and/or lateral adjustment and the like of the seat assembly components.

For example, as shown additionally in FIG. 2D, to translate a second member 20 of the seat assembly 12 relative to the first member 18 and floor 14 of the vehicle 10, a user may touch the position 70 in the area 62 of the control region 52 adjacent a corresponding position 72 on the one or more guide surfaces 56, for example, position 72 on the second portion 60 of the guide surface 56, to activate the at least one switch 34. The user may touch positions 70 to adjust the position of various seat assembly components or features, including, but not limited to, seat fore-aft movement as referenced by arrows and reference numbers 74 and 75, first member or seat bottom 18 height as referenced by arrows and reference numbers 76, 77, 78 and 79, seat lumbar position as referenced by arrow 80, seat tilt or reclination angle as referenced by arrow 82 and headrest height or position as referenced by arrow 84.

Each of the positions 70 or zones may control a specific function or operation of the adjustment system 30 of the seat assembly 12. Seat motion may be initiated based on movement across the switch 34 by the user. The surface of switch 34 may be generally linear and change the seat location based on movement along the surface. Further, localized surface contour geometries may be used which when contacted change the seat location.

The switch 34 corresponding to position 70 may be activated immediately upon detection of the presence of an object, such as a user's finger or other body portion or another type of object, contact and/or pressure applied by the user or, in the alternative, may be activated after contact and/or pressure is applied by the user to the switch 34 in position 70 for a predetermined period of time or time limit. With respect to movement across the contact surfaces of the switch 34, a fast finger motion may initiate expedited movement, while a slow finger motion initiates slow movement of the seat assembly 12. The speed may be controlled or changed based on a tapping movement by the user or by application of multiple fingers or objects to a different portion of the at least one switch 34. Continual seat motion may be enabled by the user holding a finger at the end of the switch 34 portion until the travel limit on the seat has been reached.

The controller 40 may detect the presence of an object, an adjustment force, contact and/or pressure to multiple switches 34 in positions 70. In one embodiment, the controller 40 will activate the switch 34 at a position 70 at which the presence of an object adjacent the switch is first detected or detected with two or more switches 34. Alternatively, the controller 40 may activate a switch 34 at a position 70 where the presence of an object, an adjustment force, contact and/or pressure is greatest between two or more switches 34. In yet another alternative embodiment, controller 40 may provide the power to activate the at least one actuator 32 if the controller 40 detects presence of an object, an adjustment force, contact and/or pressure to adjacent switches 34 within a defined time limit. For example, controller 40 may instruct adjustment of the height of the entire first member or seat bottom 18 if the controller 40 detects presence of an object, an adjustment force, contact and/or pressure to adjacent switches 34 within such a defined time limit.

The at least one switch 34 is operatively connected to the at least one actuator 32 to release or engage the positioning mechanism 36. The controller 40 generates and transmits an activation signal for the actuator 32 shown in FIG. 1 to actuate release of the at least one positioning mechanism 36 based upon a signal received from the at least one switch 34, thereby causing movement of the second member 20 relative to the first member 18 or some other predetermined adjustment motion to adjust a portion of the seat assembly 12.

It is also contemplated that activation of the control assembly 50 of the adjustment system 30 may be graphically represented on a vehicle display system (not shown) to assist the user in identifying activation of various features of the adjustment system 30. The operation or placement of the user's hand on the control region 52 may be displayed on the vehicle display system or alternatively be indicated by a vehicle feedback system generating one or more of haptic, visual and/or audible feedback. The feedback may be provided when at least one of the following conditions occurs, including seat motion is initiated, seat motion continues, and a seat travel stop is reached. The feedback may be different for different seat movement functions. In some vehicle operation modes, the controller 40 of the adjustment system is disabled when at least one of a vehicle impact event and/or deployment of the air bag system occurs and will be enabled when a vehicle door is opened.

Figure 3A:
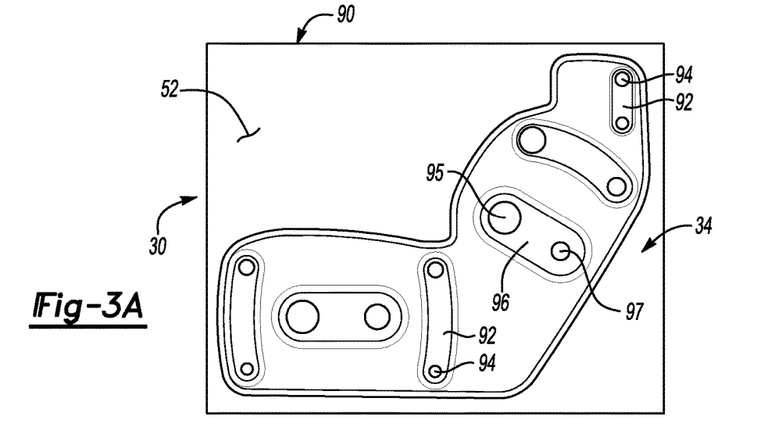
FIGS. 3A-3B illustrate side views of another embodiment of a control assembly configuration for the adjustment system of the seat assembly.
Figure 3B:
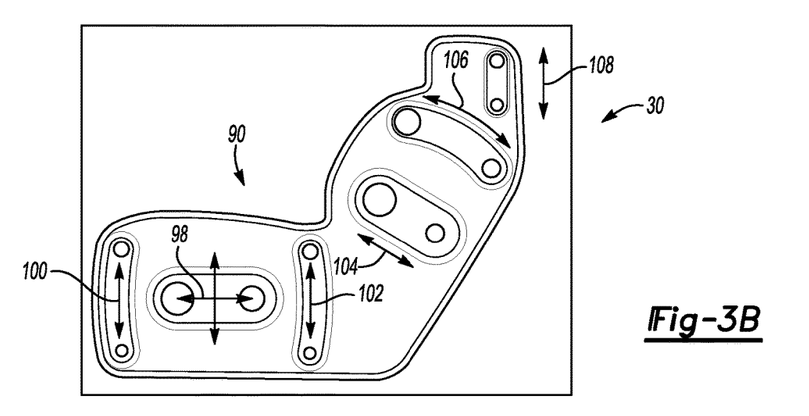

Referring now to FIGS. 3A and 3B, another embodiment of the control assembly of the adjustment system 30 of the seat assembly 12 is illustrated. As shown and described herein, a user initiates contact with the control assembly 90 via hand or finger motion to adjust the position of the seat assembly 12. One or more guide surfaces 92 of the at least one switch 34 extend from the control region 52. Guide surfaces 92 may include indicia 94 that may identify use and direction of control of the switches 34. As discussed above, guide surfaces 92 may be contoured to match the position, geometry and/or contour of the related portion of the seat assembly 12 and may be formed as touch sensitive or capacitive switches, mechanical switches and/or a piezoelectric based switch.

Additionally, the control assembly 90 of the adjustment system 30 may additionally include one or more areas 96 in the control region 52 to generally represent a portion of the seat assembly 12. Areas 96 contain one or more indicia 95, 97. It is contemplated that one or more areas 96 may receive components of the at least one switch 34 to control various functions, such as lumbar control as shown in FIG. 3B. In addition, areas 96 and guide surfaces 92 could be interchanged within the scope of the concept herein.

A user may activate at least one of the switches 34 in positions 70 to adjust the position of various seat assembly components or features, including, but not limited to, seat fore-aft movement as referenced by arrow 98, first member or seat bottom 18 height as referenced by arrows 100 and 102, seat lumbar position as referenced by arrow 104, seat tilt or reclination angle as referenced by arrow 106 and headrest height or position as referenced by arrow 108.

Figure 4A:
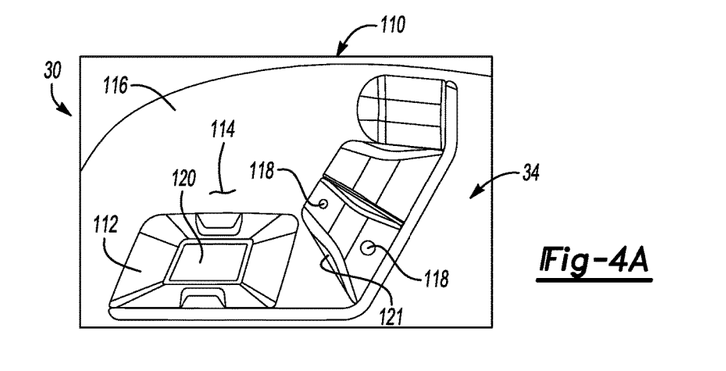
FIGS. 4A-4B illustrate side views of yet another embodiment of a control assembly configuration for the adjustment system of the seat assembly.
Figure 4B:
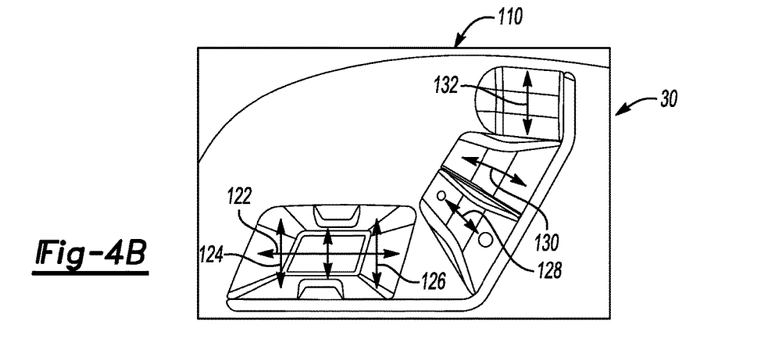

Referring now to FIGS. 4A and 4B, yet another embodiment of the control assembly of the adjustment system 30 of the seat assembly 12 is illustrated. As shown and described herein, a user initiates contact with the control assembly 110 via hand or finger motion to adjust the position of the seat assembly 12. One or more areas 112 are formed on a control region 114 of the housing 116 of the control assembly 110. It is contemplated that the one or more areas 112 may be shaped to generally represent the seat assembly 12, though the areas 112 may be formed in a variety of other configurations.

The one or more areas 112 may receive components of the at least one switch 34. For example, the one or more areas 112 may include one or more touch sensitive, piezoelectric or capacitive switches. The at least one switch 34 may include an indicia 118, such as a tactile surface or the like, to assist the user in identifying the switch 34 on the control assembly 50. At least one locating portion 120 may be integrated in the control region 114 to provide the user a reference point from which the user identifies an initial position on the control assembly 110. It is also contemplated that the locating portion may also contain one or more touch sensitive, piezoelectric or capacitive switches.

The at least one locating portion 120 may be in a position independent of the at least one switch 34 or may be located adjacent to or corresponding with the at least one switch 34. It is also contemplated that the at least one locating portion 120 may include an indicia or the like or a barrier 121 disposed between adjacent areas 112. It is also contemplated that the at least one switch 34 may incorporate a non-conductive material adjacent the switch 34 which does not activate the switch 34 if it is pushed into the switch 34.

A user may activate the at least one switch 34 in the one or more areas 112 or locating portions 120 to adjust the position of various seat assembly components or features, including, but not limited to, seat fore-aft movement as referenced by arrow 122, first member or seat bottom 18 height as referenced by arrows 124 and 126, seat lumbar position as referenced by arrow 128, seat tilt or reclination angle as referenced by arrow 130 and headrest height or position as referenced by arrow 132.

Figure 5A:
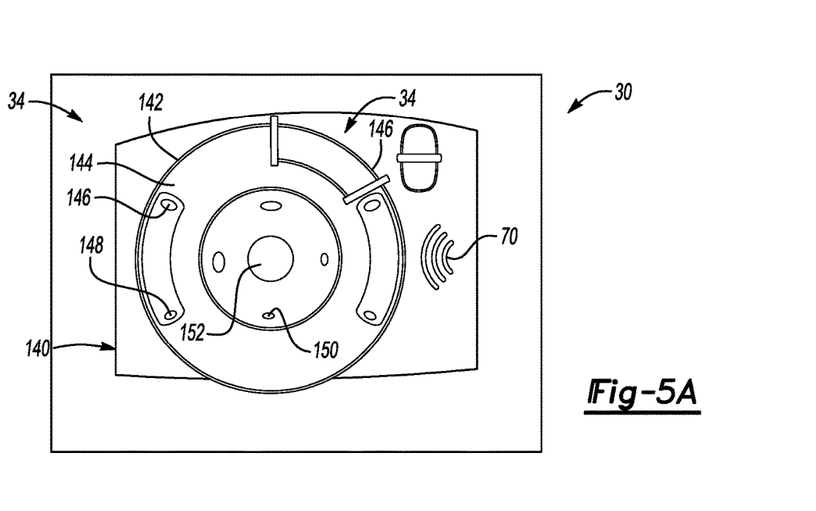
FIGS. 5A-5B illustrate side views of another embodiment of a control assembly configuration for the adjustment system of the seat assembly.
Figure 5B:
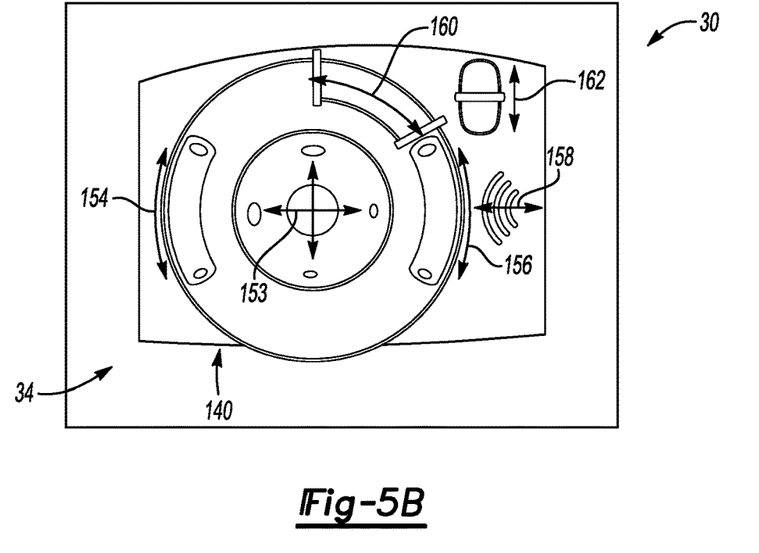

Referring now to FIGS. 5A and 5B, another embodiment of the control assembly of the adjustment system 30 of the seat assembly 12 is illustrated. As shown and described herein, a user initiates contact with the control assembly 140 via hand or finger motion to adjust the position of the seat assembly 12. Control assembly 140 may include a generally spherical shaped housing 142 having a first portion 144 at least partially received within and movable relative to a second portion 146.

At least one switch 34 may be disposed on the second portion 146 and include one or more projections 148. Projections 148 may include indicia 150 that may identify use and direction of control of the switches 34. As discussed above, projections 148 may be contoured to match the position, geometry and/or contour of the related portion of the seat assembly 12 and may be formed as touch sensitive or capacitive switches, mechanical switches and/or a piezoelectric based switch. Additionally, the second portion 148 of the housing 142 of the control assembly 140 may additionally include one or more areas 152 may receive switches 34 to control various functions, such as seat tilt or reclination angle as shown in FIG. 5B.

A user may activate at least one of the switches 34 in positions 70 to adjust the position of various seat assembly components or features, including, but not limited to, seat fore-aft movement as referenced by arrow 153, first member or seat bottom 18 height as referenced by arrows 154 and 156, seat lumbar position as referenced by arrow 158, seat tilt or reclination angle as referenced by arrow 160 and headrest height or position as referenced by arrow 162.

It is further contemplated that a method for selectively adjusting a seat assembly 12 with an adjustment system 30 may be used to accomplish the objectives of the disclosure. The method comprises providing a control assembly including a housing having a control region, one or more guide surfaces extending from the control region and one or more areas cooperating with the one or more guide surfaces where at least one of the areas or the guide surfaces receive at least one switch. A first signal is generated by the at least one switch in response to activation of the at least one switch by a user. A controller receives the first signal in electrical communication with the at least one switch.

An activation signal is transmitted from the controller to at least one actuator and one or more of a first member and a second member of the seat assembly are positioned with at least one positioning mechanism operatively connected to the at least one actuator in response to the activation signal. The method further comprises providing a plurality of mechanical, capacitive or piezoelectric switches in the one or more areas that are configured to generate the first signal in response to activation by the user. The method may further comprise generating a signal to instruct continuous activation of the at least one actuator and at least one positioning mechanism in response to continuous activation of the plurality of switches. The method may further comprise providing feedback in response to activation of the at least one actuator and at least one positioning mechanism, wherein the feedback is selected from a group consisting of audible, visual and haptic feedback.

As discussed above, the seat assembly 12 may incorporate one or more control assemblies 50 for use with the at least one seat adjustment system 30. Further, the seat adjustment system 30 may include multiple switches 34 for activating multiple actuators 32 to release a corresponding positioning mechanism 36 of the seat assembly 12. Although several examples of control assemblies 50 for use with the seat adjustment system 30 have been illustrated, one skilled in the art would be able to contemplate other configurations of a control assembly 50. Additionally, other numbers, positions, and configurations of actuators 32, switches 34 and/or positioning mechanisms 36 for use in positioning of a particular seat assembly 12 than those discussed herein may also be contemplated.

It is also contemplated that the control assembly 50 and the adjustment system 30 may be incorporated into other vehicle latching components, such as, but not limited to, doors, hatches, tailgates, deck lids, sunroofs, interior storage components, including the center console, glove box, sun visors and the like. Further, non-automotive applications, such as home furniture seating systems which utilize latching systems or the like, may also benefit from use of the control assembly 50 and adjustment system 30 described herein.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A seat assembly comprising:
    a first member;
    a second member located proximate to the first member; and
    an adjustment system for adjustably positioning the first and second members of the seat assembly, the adjustment system including:
        at least one positioning mechanism operatively connected to one or more of the first member and the second member,
        at least one actuator connected to the at least one positioning mechanism,
        a control assembly including a control region, one or more guide surfaces extending from the control region, one or more areas formed on the control region and extending at least partially about an outer periphery of the one or more guide surfaces, and at least one capacitive switch cooperating with at least one of the one or more areas and at least one of the one of the more guide surfaces, wherein the at least one capacitive switch is configured to send at least a first signal when a user activates the at least one capacitive switch, and
        a controller in communication with the at least one capacitive switch and the at least one actuator, wherein the controller is configured to receive at least the first signal from the at least one capacitive switch and generate an activation signal to activate the at least one actuator in response to at least the first signal,
        wherein the one or more guide surfaces and one or more areas of the control assembly are formed on the control region to represent the first member and second member of the seat assembly to guide the user to the at least one capacitive switch.

2. The seat assembly of claim 1 wherein the one more guide surfaces of the housing of the control assembly further comprises a unitary guide surface extending from the control region shaped to represent the first member and second member of the seat assembly.

3. The seat assembly of claim 1 wherein the control assembly further comprises indicia provided on one or more of the one or more guide surfaces and the one or more areas, wherein the indicia are configured to identify the location of the at least one capacitive switch on the control region of the control assembly.

4. The seat assembly of claim 3 wherein the indicia further comprises at least one of a tactile surface and a three dimensional shape provided on one or more of the at least one capacitive switch, one or more guide surfaces and one or more areas.

5. The seat assembly of claim 3 wherein the one or more areas further comprise at least one from the group selected from one or more recessed areas provided on the control region and one or more raised areas provided on the control region.

6. The seat assembly of claim 5 wherein the at least one capacitive switch is located on at least one of the one or more recessed areas adjacent the outer periphery of the one or more guide surfaces.

7. The seat assembly of claim 1 wherein the control assembly further comprises at least one locating portion disposed on the control region to provide a reference area for one or more of the at least one capacitive switch, one or more guide surfaces and one or more areas.

8. The seat assembly of claim 1 wherein the at least one capacitive switch further comprises a capacitive sensor configured to detect activation of the at least one capacitive switch, wherein the capacitive sensor generates at least the first signal in response to detecting a change in capacitance in response to the presence of the user proximate the at least one capacitive switch disposed on at least one of the one or more guide surfaces and the one or more areas.

9. An adjustment system for adjustably positioning at least one of a first member and a second member of an assembly comprising:
    at least one positioning mechanism operatively connected to one or more of the first member and the second member the assembly;
    at least one actuator connected to the at least one positioning mechanism;
    a control assembly including a control region, one or more guide surfaces extending from the control region, one or more recessed areas formed on the control region and extending at least partially about an outer periphery of the one or more guide surfaces, and at least one capacitive switch cooperating with at least one of the one or more recessed areas and at least one of the one of the more guide surfaces, wherein the at least one capacitive switch is configured to send at least a first signal when a user activates the at least one capacitive switch; and
    a controller in communication with the at least one capacitive switch and the at least one actuator, wherein the controller is configured to receive at least the first signal from the at least one capacitive switch and generate an activation signal to activate the at least one actuator in response to at least the first signal,
    wherein the one or more guide surfaces and one or more recessed areas of the control assembly are formed on the control region to represent the first member and second member of the assembly to guide the user to the at least one capacitive switch.

10. The adjustment system of claim 9 wherein the one more guide surfaces of the housing of the control assembly further comprises a unitary guide surface extending from the control region shaped to represent the first member and second member of the assembly.

11. The adjustment system of claim 9 wherein the control assembly further comprises indicia provided on one or more of the one or more guide surfaces and the one or more recessed areas, wherein the indicia are configured to identify the location of the at least one capacitive switch on the control region of the control assembly.

12. The adjustment system of claim 11 wherein the indicia further comprises at least one of a tactile surface and a three dimensional shape provided on one or more of the at least one capacitive switch, one or more guide surfaces and one or more recessed areas.

13. The adjustment system of claim 9 wherein the at least one capacitive switch is located on at least one of the one or more recessed areas adjacent the outer periphery of the one or more guide surfaces.

14. The adjustment system of claim 9 wherein the first member of the assembly comprises a seat bottom and the second member of the assembly comprises a seat back adjustably connected to and positionable relative to the seat bottom.

15. The adjustment system of claim 9 wherein the control assembly further comprises at least one locating portion disposed on the control region to provide a reference area for one or more of the at least one capacitive switch, one or more guide surfaces and the one or more recessed areas.

16. The adjustment system of claim 9 wherein the at least one capacitive switch further comprises a capacitive sensor configured to detect activation of the at least one capacitive switch, wherein the capacitive sensor generates at least the first signal in response to detecting a change in capacitance in response to the presence of the user proximate the at least one capacitive switch disposed on at least one of the one or more guide surfaces and the one or more recessed areas.

17. An adjustment system for adjustably positioning at least one of a first member and a second member of an assembly comprising:
    at least one positioning mechanism operatively connected to one or more of the first member and the second member the assembly;
    at least one actuator connected to the at least one positioning mechanism;
    a control assembly, the control assembly including:
        a control region,
        a unitary guide surface extending from the control region shaped to represent the first member and second member of the assembly,
        one or more recessed areas formed on the control region and extending at least partially about an outer periphery of the unitary guide surface,
        at least one capacitive switch cooperating with at least one of the one or more recessed areas and the unitary guide surface, wherein the at least one capacitive switch is configured to send at least a first signal when a user activates the at least one capacitive switch, and
        indicia provided on one or more of the unitary guide surface and the one or more recessed areas, wherein the indicia are configured to identify the location of the at least one capacitive switch on the control region of the control assembly,
        wherein the unitary guide surface, one or more recessed areas and indicia are provided on the control region of the control assembly to guide the user to the at least one capacitive switch; and
    a controller in communication with the at least one capacitive switch and the at least one actuator, wherein the controller is configured to receive at least the first signal from the at least one capacitive switch and generate an activation signal to activate the at least one actuator in response to at least the first signal.

18. The adjustment system of claim 17 wherein the indicia further comprises at least one of a tactile surface and a three dimensional shape provided on one or more of the unitary guide surface and the one or more recessed areas.

19. The adjustment system of claim 17 wherein the control assembly further comprises at least one locating portion disposed on the control region to provide a reference area for one or more of the at least one capacitive switch, the unitary guide surface and the one or more recessed areas.

20. The adjustment system of claim 17 wherein the at least one capacitive switch further comprises a capacitive sensor configured to detect activation of the at least one capacitive switch, wherein the capacitive sensor generates at least the first signal in response to detecting a change in capacitance in response to the presence of the user proximate the at least one capacitive switch disposed on at least one of the unitary guide surface and the one or more recessed areas.

* * * * *